May 22, 1945. J. AKINS 2,376,647
AMPHIBIOUS VEHICLE
Filed Feb. 19, 1944
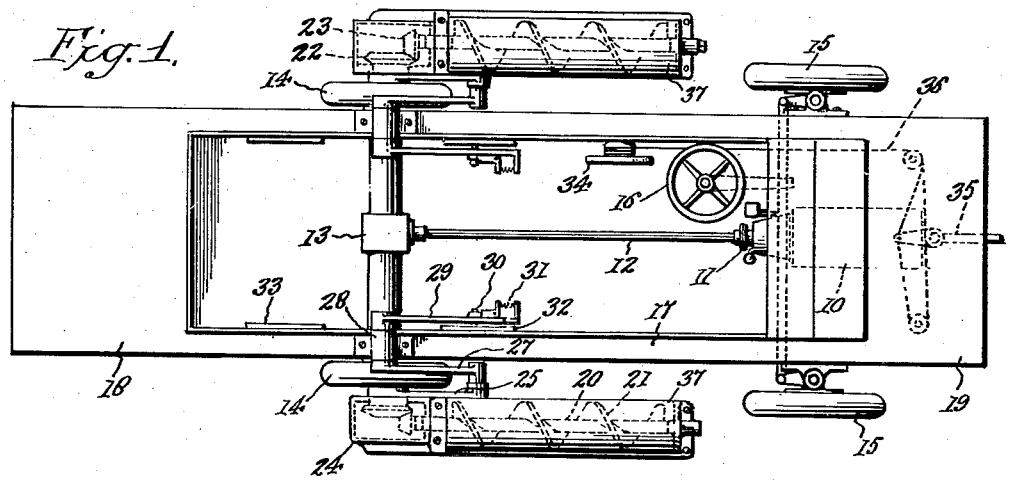
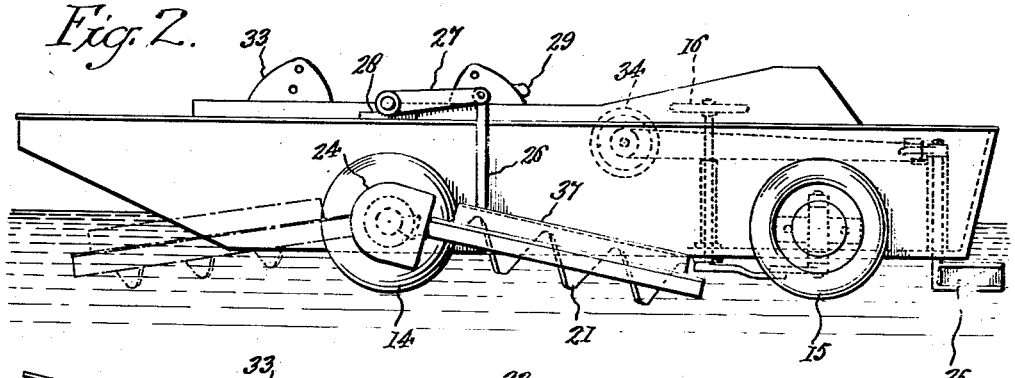
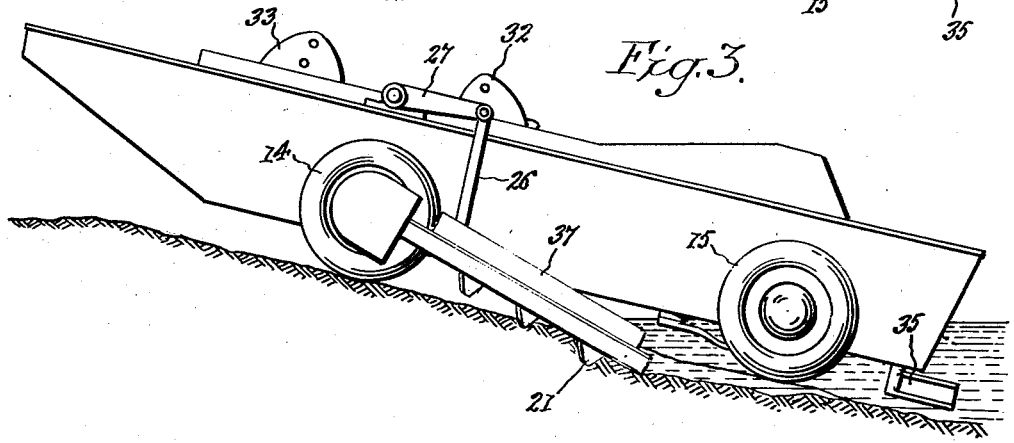
Inventor
Jake Akins
By A. Yates Dowell
Attorney Patented May 22, 1945

2,376,647

UNITED STATES PATENT OFFICE 2,376,647

AMPHIBIOUS VEHICLE

Jake Akins, Statesboro, Ga., assignor of one-half to Alfred A. Dorman, Statesboro, Ga.

Application February 19, 1944, Serial No. 523,137

5 Claims. (Cl. 115—1)

This invention relates to vehicles both land and water and more particularly amphibious vehicles with propulsion means for driving them on land or sea.

Amphibious vehicles heretofore used have had certain defects or limitations and it is therefore an object of the invention to provide an improved simple and inexpensive amphibious vehicle which utilizes the running gear of an automobile but with propellers which can be operated not only for driving the vehicle on land or sea but also particularly for positively driving the vehicle into or from the water at the water's edge.

In the drawing,

Figure 1 is a top plan illustrating one application of the invention;

Fig. 2, a side elevation of the vehicle in the water with a propeller shown in an alternate position in dotted lines; and Fig. 3, a similar view with the vehicle emerging from the water onto the land.

As shown in the drawing, an automobile stripped until it includes only the running parts forms the skeleton of the land vehicle. The motor 10, shown in dotted lines, through the usual transmission 11, drive shaft 12, differential 13, and axle (not shown), transmits power to the wheels 14 preferably with pneumatic tires or the like. Additional wheels 15 are steered in a manner corresponding to the ordinary automobile steering mechanism which includes a steering wheel 16. Except for the motor the above parts constitute the running gear of the vehicle.

This vehicle is provided with a body 17 capable of accommodating passengers and the vehicle may be driven forwardly or backwardly, and steered by the steering wheel 16. The body 17 is so constructed and water-proofed that it constitutes a boat with a bow 18 and a stern 19. The drive wheels 14 are nearest the bow and the steerable wheels 15 are nearest the stern. With the parts in this relation it is desired to have the drive wheels operate reversely to that of the ordinary automobile. That is, the drive wheel should rotate to propel the vehicle faster in a backward direction than in a forward direction. Since the drive wheels are nearest the bow the boat will move forwards faster than backwards. To accomplish this the ring gear of the differential is reversed so that the vehicle will be pulled by the drive wheels 14 instead of pushed.

Screw propellers are provided for driving or propelling the vehicle within the water one at each side of the boat, and each propeller including a shaft 20 and a helical blade 21. These propellers are driven from the transmission of the vehicle by connections outside of the driving wheels including bevel gears 22 and 23 in gear boxes 24. The bevel gears 22 are driven from the transmission and driving wheels and in turn drive the bevel gears 23 on the propeller shafts 20.

The gear boxes 24 are swiveled on the driving wheels so that the propellers can take any angle necessary or be swung from a position rearwardly of the driving wheels to a position forwardly of the same by the levers.

Means is provided for swinging each of the propellers including a bracket 25 and link 26 connected to one arm 27 of a yoke journalled at 28 on the body of the boat, said yoke having its other arm 29 forming an operating lever for swinging the propeller forwardly or rearwardly as desired.

The operating lever 29 has a pivoted locking detent 30 projected by a spring 31 into contact with apertures in a plate 32 and a corresponding apertured plate 33 at the opposite position of the lever, thus the propellers may be locked in either extreme position.

By removing the detent from its receiving aperture the propellers may be released. A steering wheel 34 may be used to control the rudder 35 of the boat by means of a cable 36.

In order to prevent the propellers from throwing water on the occupants of the boat removable covers 37 may be provided.

With the construction described, the vehicle will travel on sea and land and will climb out of or into the water readily. This is accomplished by the propellers engaging both the water and the land, including wet land or mud. When operating as a land vehicle the rudder may be fastened in a definite position, while when travelling in the water the steering gear and front wheels may be locked as in the ordinary automobile, and the device guided by the propeller through the steering wheel 34.

On a small boat the propellers on the side afford greater speed and pulling power, while on a big boat like a battleship, propellers at the end will be preferred.

It will be obvious to those skilled in the art that various changes may be made in the invention without departing from the spirit thereof, and the invention is not limited to what is described in the specification and illustrated in the drawing, but only as indicated in the appended claims.

What is claimed is:

1. An amphibious vehicle comprising the running gear of an automobile including rear steerable wheels and front drive wheels for propelling the vehicle on land, a body forming a boat for maintaining said running gear afloat, means for propelling the device while in the water comprising a pair of relatively long screw propellers one on each side of the boat, and having driving connections with said drive wheels, said screw propellers being pivoted so that they may be disposed forwardly or rearwardly of the drive wheels and at an angle to the horizontal whereby both the screw propellers and the driving wheels may be used for causing the vehicle to travel from water onto land or the reverse.

2. An amphibious vehicle comprising a running gear including drive wheels for propelling the vehicle on land, a body forming a boat for maintaining said running gear afloat, and propellers beside said body mounted to be driven from said running gear, said propellers including elongated rotatable shafts and helical blades on said shafts said propellers being swingable from substantially horizontal positions beside the boat to opposite positions substantially 180° from the first position, and being disposable at an inclination to the horizontal.

3. An amphibious vehicle comprising the running gear of an automobile including steerable wheels and drive wheels for the propulsion of the vehicle on land, a body forming a boat for maintaining said running gear afloat, said running gear and boat being assembled with said drive wheels near the bow of the boat and the steerable wheels toward the stern, said running gear of the vehicle being constructed so that the boat will be propelled forward at a greater rate of speed than in the opposite direction, screw propellers one on each side of the boat for propelling the vehicle in the water, means for driving said propellers from said running gear, and means mounting said propellers so that the inclination of the same may be varied.

4. An amphibious vehicle comprising the running gear of an automobile including steerable wheels and drive wheels for the propulsion of the vehicle on land, a body forming a boat for maintaining said running gear afloat, said running gear and boat being assembled with said drive wheels near the bow of the boat and the steerable wheels toward the stern, said running gear of the vehicle being constructed so that the boat will be propelled forward at a greater rate of speed than in the opposite direction, screw propellers one on each side of the boat for propelling the vehicle in the water, means for driving said propellers from said running gear, means mounting said propellers so that the inclination of the same may be varied so that they can engage the mud to propel the vehicle from the water, and means for locking said propellers at a fixed inclination.

5. An amphibious vehicle comprising the runninng gear of an automobile including steerable wheels and drive wheels for the propulsion of the vehicle on land, a body forming a boat for maintaining said running gear afloat, said running gear and boat being assembled with said drive wheels near the bow of the boat and the steerable wheels toward the stern, said running gear of the vehicle being constructed so that the boat will be propelled forward at a greater rate of speed than in the opposite direction, a screw propeller for propelling the vehicle in the water, means for driving said propeller from said running gear, and means mounting said propeller so that the inclination of the same may be varied.

JAKE AKINS.